United States Patent
Sipos et al.

(10) Patent No.: US 10,030,097 B2
(45) Date of Patent: Jul. 24, 2018

(54) POLYESTER-CONTAINING OBJECT MADE FROM MELT-PROCESSING POLY(ETHYLENE-2,5-FURANDICARBOXYLATE)

(71) Applicant: Furanix Technologies B.V., Amsterdam (NL)

(72) Inventors: Laszlo Sipos, Amsterdam (NL); Gerardus Johannes Maria Gruter, Amsterdam (NL); Jeffrey John Kolstad, Amsterdam (NL); Matheus Adrianus Dam, Amsterdam (NL)

(73) Assignee: Furanix Technologies B.V., Amsterdam (NL)

( * ) Notice: Subject to any disclaimer, the term of this patent is extended or adjusted under 35 U.S.C. 154(b) by 0 days.

(21) Appl. No.: 15/353,051

(22) Filed: Nov. 16, 2016

(65) Prior Publication Data

US 2017/0066875 A1    Mar. 9, 2017

Related U.S. Application Data

(63) Continuation of application No. 14/353,138, filed as application No. PCT/NL2012/050738 on Oct. 24, 2012, now Pat. No. 9,527,954.

(60) Provisional application No. 61/550,707, filed on Oct. 24, 2011.

(30) Foreign Application Priority Data

Oct. 25, 2011    (NL) .................................... 2007650

(51) Int. Cl.
| | | |
|---|---|---|
| C08G 63/672 | (2006.01) | |
| C08G 63/181 | (2006.01) | |
| C08G 63/80 | (2006.01) | |
| C08G 63/86 | (2006.01) | |
| B29C 49/00 | (2006.01) | |
| B29C 49/06 | (2006.01) | |
| B29L 31/00 | (2006.01) | |

(52) U.S. Cl.
CPC ........ C08G 63/672 (2013.01); B29C 49/0005 (2013.01); B29C 49/06 (2013.01); C08G 63/181 (2013.01); C08G 63/80 (2013.01); C08G 63/866 (2013.01); B29K 2023/06 (2013.01); B29L 2031/7158 (2013.01)

(58) Field of Classification Search
CPC ...... C08G 63/88; C08G 63/866; C08G 63/16; C08G 63/80; C08G 63/181
See application file for complete search history.

(56) References Cited

U.S. PATENT DOCUMENTS

| | | | |
|---|---|---|---|
| 2009/0005531 A1 | 1/2009 | Thomspon et al. | |
| 2009/0124763 A1* | 5/2009 | Matsuda | ................ C08G 63/16 525/437 |
| 2010/0174044 A1 | 7/2010 | Eritate | |
| 2011/0282020 A1 | 11/2011 | Sipos | |

FOREIGN PATENT DOCUMENTS

| | | |
|---|---|---|
| GB | 621971 | 4/1949 |
| JP | H11-310629 A | 11/1999 |
| JP | 2000-26587 A | 1/2000 |
| JP | 2000-95926 A | 4/2000 |
| JP | 2004-224932 A | 8/2004 |
| JP | 2008-291244 A | 12/2008 |
| WO | 2007/052847 A1 | 5/2007 |
| WO | 2010/077133 A1 | 7/2010 |
| WO | 2010/132740 A2 | 11/2010 |
| WO | 2011/043660 A2 | 4/2011 |
| WO | 2011/043661 A1 | 4/2011 |

OTHER PUBLICATIONS

Olabisi, O.; Handbook of Thermoplastics, 1997, Chapter 18, p. 417-447.*
Hachihama, Yoshikazu, et al., "Syntheses of Polyesters containing Furan Ring", No. 333, Technol. Repts. Osaka Univ., 1958, 8, 475-480.
Machine Translation for JP2008-291244 A, Apr. 11, 2014.
Moore, J.A., et al., "Polyesters Derived from Furan and Tetrahydrofuran Nuclei", XP-002413093, Macromolecules, 1978, vol. 11, No. 3, 568-480.
Office Action dated Apr. 29, 2015 from the Chinese Patent Office for a counterpart foreign application.
Abdel-Barry, E.M.; Handbook of Plastic Films, 2003, p. 213-214.
Chang, S., et al.; Journal of Applied Polymer Science, vol. 28, 1983, 3289-3300.
International Search Report, PCT/NL2012/050738, dated Jan. 21, 2013.
Netherlands Search Report, Application No. 2007650, dated Jun. 1, 2012.
Japanese Office Action for counterpart Japanese Application No. 2014-538743, dated Aug. 29, 2017.

* cited by examiner

*Primary Examiner* — Robert Jones, Jr.
(74) *Attorney, Agent, or Firm* — Hoffmann & Baron, LLP

(57) ABSTRACT

A polyester-containing object, such as an injection stretch blow molded bottle, a biaxially oriented film or a drawn fiber, is made from melt-processing poly(ethylene-2,5-furandicarboxylate). The poly(ethylene-2,5-furandicarboxylate) has a number average molecular weight of at least 25,000, as determined by GPC based on polystyrene standards, and includes an antimony catalyst.

6 Claims, No Drawings

POLYESTER-CONTAINING OBJECT MADE FROM MELT-PROCESSING POLY(ETHYLENE-2,5-FURANDICARBOXYLATE)

CROSS-REFERENCE TO RELATED APPLICATIONS

This application is a continuation of U.S. application Ser. No. 14/353,138, filed Apr. 21, 2014, which is the National Stage of International Application No. PCT/NL2012/050738 filed Oct. 24, 2012, which claims the benefit of Netherlands Application No. 2007650, filed Oct. 25, 2011 and the benefit of U.S. Provisional Application No. 61/550,707, filed Oct. 24, 2011, the contents of all of which are incorporated by reference herein.

TECHNICAL FIELD

This invention relates to a process for preparing polymers having 2,5-furandicarboxylic acid (abbreviated to 2,5-FDCA) moieties and to a process for preparing such polymers. In particular, this invention relates to polyesters and to a process of preparing them at high molecular weight without suffering from discoloration which can be used in bottle, film or fibre applications.

BACKGROUND ART

FDCA (also known as dehydromucic or pyromucic acid), is a natural di-acid that is produced in the healthy human body at 3-5 mg quantities per day. Routes for its preparation using air oxidation of 2,5-disubstituted furans such as 5-hydroxymethylfurfural with catalysts comprising Co, Mn and/or Ce were reported recently in WO2010/132740, WO2011/043660 and WO2011/043661.

In GB 621971 polyesters and polyester-amides are prepared by reacting glycols with dicarboxylic acids of which at least one contains a heterocyclic ring, such as 2,5-FDCA. Under melt polymerization conditions, using sodium- and magnesium methoxide as a catalyst, FDCA dimethyl ester and 1.6 equivalents of ethylene glycol were reacted in a transesterification step at ambient pressure between 160 and 220° C., after which the polycondensation was carried out between 190 and 220° C. under 3 mm Hg. The product had a reported melting point of 205-210° C. and readily yielded filaments from the melt. No additional properties were reported for PEF or other FDCA based polyesters in this 1946 document.

In HACHIHAMA, Yoshikazu the syntheses of Polyesters containing a Furan Ring are reported. In this paper polyesters are produced by condensation of 2,5-FDCA with various α,ω-glycols. According to this paper, ester interchange has proved to be the most convenient method for 2,5-furandicarboxylic acid polyesters, since the acid is difficult to be purified. The ester interchange reaction is promoted by the presence of a catalyst such as litharge, a natural mineral form of lead(II) oxide. The polymers made, however, were brown to greyish white.

The publication describes polyethylene-furandicarboxylate (PEF) with a melting point between 220 and 225° C., obtained using a lead catalyst. Also reported were the tri-, tetra-, penta- and hexamethylene diol polyester analogues with reported melting ranges of 115 to 120° C., 163 to 165° C., 70° C. and 143 to 145° C., respectively. For the ethylene glycol and 1,4-butanediol polyesters, fibre forming properties were reported. The polymers made were reported to be brown to greyish white.

In MOORE, J. A. polyesters derived from furan and tetrahydrofuran nuclei are described. Polymers were prepared using 2,5-furandicarbonyl chloride as monomer. As a result, polymers in the form of a white precipitate having a very low intrinsic viscosity (and hence low molecular weight) were obtained. In addition, a polymer was prepared from 1,6-hexane diol and dimethyl-2,5-furandicarboxylate, using calcium acetate and antimony oxide as catalyst. The number average molecular weight was low (less than 10,000), whereas the molecular weight distribution was relatively high (2.54 instead of about 2). Moreover, the product was greenish. Again, from this reference it would appear near impossible to produce polymers having a 2,5-furandicarboxylate moiety within the polymer backbone, at high molecular weight and without coloured impurities, without having to use a precipitation and/or purification step.

In WO 2007/052847 polymers are provided, having a 2,5-furandicarboxylate moiety within the polymer backbone and having a degree of polymerization of 185 or more and 600 or less. These polymers are made in a three step process involving the esterification of the 2,5-FDCA with a diol first using a tin catalyst and a titanium catalyst, and a second step involving polycondensation through an ester exchange reaction. The first step is carried out catalytically at a temperature within the preferred range of 150 to 180° C., whereas the polycondensation step is carried out under vacuum at a temperature within the preferred range of 180 to 230° C. The product is then purified by dissolving the same in hexafluoroisopropanol, re-precipitation and drying, followed by the third step, a solid state polymerization at a temperature in the range of from 140 to 180° C. Not disclosed, but found by the current inventors, is that the intermediate product produced by the process of this reference is darkly coloured. This is therefore the reason for the purification step. This essential purification step, and in particular when using hexafluoroisopropanol, is a serious drawback of this process, severely limiting the commercialization thereof. The problem vis-à-vis this recent development is to produce polymers having a 2,5-furandicarboxylate moiety within the polymer backbone, at high molecular weight and without coloured impurities, without having to use a purification step. Also polyesters from 1,3-propanediol and 1,4-butanediol were reported.

Conditions and reported properties of the 3 steps for the 3 polyesters are summarized in Table 1 below.

TABLE 1

| | Experimental results from JP2008/291244 | | | |
|---|---|---|---|---|
| Monomer | conditions step 1 (Esterification) | conditions step 2 (Polycondensation) | conditions step 3 (Solid Stating) | Product properties |
| Ethylene glycol | 280° C.; 4 hours | 280° C.; 6.5 hours | 180° C. | $M_n$ = 23000; $T_m$ = 170° C.; $T_g$ = 85° C.; $T_c$ = 156° C.; $T_{dec}$ = 332° C. |
| 1,3-propanediol | 230° C.; 4 hours | 230° C.; 6.5 hours | 140° C. | $M_n$ = 15000; $T_m$ = 150° C.; $T_g$ = 39° C.; $T_c$ = 102° C.; $T_{dec}$ = 335° C. |

TABLE 1-continued

Experimental results from JP2008/291244

| Monomer | conditions step 1 (Esterification) | conditions step 2 (Polycondensation) | conditions step 3 (Solid Stating) | Product properties |
|---|---|---|---|---|
| 1,4-butanediol | 170° C.; 4 hours | 180° C.; 6.5 hours | 150° C. | $M_n$ = 60000; $T_m$ = 170° C.; $T_g$ = 31° C.; $T_c$ = 90° C.; $T_{dec}$ = 338° C. |

In JP2008/291244 a method for producing polyester resin including furan structure is provided. The method for producing a polyester resin including a furan structure comprises performing ester exchange reaction of a furandicarboxylic dialkyl ester component with a diol component, and then performing polycondensation reaction in the presence of a titanium tetrabutoxide/magnesium acetate mixed catalyst system. The molecular weight of the polyester resin leaves still much to desire, as does the polymerization time (7.5 hours) to achieve a reasonably high molecular weight.

In WO2010/077133 a tin catalyst was used for both the transesterification step and the polycondensation step. Although colour and Mn were better than any result reported at that time, the colour of the resulting resin in not good enough for application in bottles, fibres and films.

From the above references, it is clear that PEF has been known for more than 70 years and that many different recipes have been used in which temperatures, pressures, di-acid/diol stoechiometries, catalysts and precursors (di-acid or di-ester) have been varied.

DISCLOSURE OF THE INVENTION

The invention thus relates to a process for the production of polymers and copolymers having a 2,5-furandicarboxylate moiety within the polymer backbone. The (co)polymers so prepared are have a number average molecular weight of at least 25,000 (as determined by GPC based on polystyrene standards), and an absorbance as a 5 mg/mL solution in a dichloromethane:hexafluoroisopropanol 8:2 mixture at 400 nm of below 0.05. The use of these high molecular weight (co)polymers as well as their use in the preparation of bottles, fibres or films is believed to be novel. Thus, the invention also relates to these bottles, fibres and films.

MODES FOR CARRYING OUT THE INVENTION

More in detail, the process of the current invention is similar to the process for preparing poly(ethylene terephthalate) (PET) but has some characterizing distinctions. Thus, whereas PET is typically made with catalysts such as, manganese, cobalt and germanium, as mentioned above, we found that these catalysts result in a coloured product. Likewise, whereas bright-white PET can be made directly from a diol monomer and a diacid monomer, the current inventors found that the use of 2,5-FDCA inevitably results in a coloured product. Moreover, whereas PET is typically made by esterification at polymerization temperatures of 250-280° C. and higher, again the inventors found that the polymers based on 2,5-FDCA made at such polymerization temperatures were coloured product. Coloured in this respect can be determined quantitatively by measuring the absorbance at 400 nm of a 5 mg/mL solution of the (co)polymer in dichloromethane:hexafluoroisopropanol 8:2 solvent mixture. If the absorbance is 0.05 or greater, then the product is deemed inferior.

Moreover, the current inventors found that the analogous process results in the formation of a by-product with a lower molecular weight, which therefore results in a broader molecular weight distribution. This adversely affects the properties of the polymers so produced.

These problems have been addressed, as discussed hereinafter.

Thus, the process of the current invention is a three-step process, wherein first a prepolymer is made having a 2,5-furandicarboxylate moiety within the polymer backbone. This intermediate product is preferably an ester composed of two diol monomers and one diacid monomer, wherein at least part of the diacid monomers comprises 2,5-FDCA, followed by a melt-polymerization of the prepolymers under suitable polymerization conditions. Such conditions typically involve reduced pressure to remove the equimolar excess of diol monomers.

A skilled person will realise that the amounts of diester and diol may vary. Suitably the diol and diester are used in a diol to diester molar ratio of 1.5 to 3.0, more preferably 2.0 to 2.5.

For instance, within the scope of the current invention, in step 1, dimethyl-2,5-furandicarboxylate is reacted in a catalysed transesterification process in the presence of a metal catalyst with about 2 equivalents of a diol, to generate the prepolymer whilst removing 2 equivalents of methanol. Dimethyl-2,5-furandicarboxylate is preferred, as this transesterification step generates methanol, a volatile alcohol that is easy to remove. However, as starting material diesters of 2,5-FDCA with other volatile alcohols, diols or phenols (e.g., having a boiling point at atmospheric pressure of less than 150° C. may be used as well. Preferred examples therefore include ethanol, methanol, or a mixture of ethanol and methanol. Alternatively, instead of starting with dimethyl-2,5-furandicarboxylate, the diester of ethylene glycol, di(hydroxyethyl)-2,5-furandicarboxylate, can be used as well. In this case the transesterification with ethylene glycol can be skipped.

The inventors have found that it is preferred that in case the dimethyl ester of FDCA is used, the first step is a transesterification step, catalysed by a specific transesterification catalyst, preferably for a period of 1 to 3 hours at preferred temperature range of from about 150 to about 220° C., preferably in the range of from about 180 to about 200° C. and carried out until the starting ester content is reduced, preferably until it reaches the range of less than 1 mol % to about 0.1 mol %. The transesterification should preferably be performed for at least one, but more preferably for at least 2 hours at a temperature above 180° C. Longer reaction times at lower temperature can be used as well but this is less desired from an economic point of view. The transesterification catalyst may be removed or may be neutralized by adding a Lewis base, to avoid interaction in the second step of polycondensation, but can be included in the second step.

Examples of alternative or additional transesterification catalysts that may be used in step 1 include one or more of titanium(IV) alkoxides or titanium(IV) chelates, mixtures of salts of calcium or magnesium or strontium or zinc, or a mixture of any of these salts. In the case of ethylene glycol containing polyesters, one or more of calcium or magnesium or strontium or zinc salts are particularly suitable. Although these alternative or additional catalysts may be suitable for the transesterification, they may actually interfere during the polycondensation step which will require the addition of a Lewis base before starting the polycondensation step. Therefore a preferred transesterification catalyst for the reaction of dimethyl-2,5-furandicarboxylate with ethylene glycol is a soluble calcium or zinc salt, such as calcium or zinc acetate. In respect of the catalyst, it should be realized that the active catalyst as present during the reaction may be different from the catalyst as added to the reaction mixture. Ligands or counterions will be exchanged in the reactor.

The catalysts are used in an amount of about 0.005 mol % relative to initial diester to about 0.2 mol % relative to initial diester, more preferably in an amount of about 0.01 mol % of initial diester to about 0.05 mol % of initial diester.

Step 2 of the process of the current invention, is a catalyzed polycondensation step, wherein the prepolymer is polycondensed under reduced pressure, at an elevated temperature and in the presence of a suitable catalyst.

The intermediate product from step 1 (i.e., the prepolymer) may, but importantly need not be isolated and/or purified. Preferably, the product is used as such in the subsequent polycondensation step. In this catalyzed polycondensation step, the prepolymer is polycondensed under reduced pressure, at an elevated temperature and in the presence of a suitable catalyst. The temperature is in the range of about the melting point of the polymer to about 30° C. above this melting point, but not less than 180° C. The pressure should be reduced gradually to as low as it is possible, preferably below 1 mbar.

Again, the inventors have found that it is preferred that this second step is catalysed by a specific polycondensation catalyst and that the reaction is carried out at mild melt conditions.

Examples of suitable polycondensation catalysts include titanium alkoxides or antimony salts such as solubilised antimony oxide or antimony acetate.

The polycondensation catalysts are used in an amount of about 0.005 mol % relative to initial diester to about 0.2 mol % relative to initial diester, more preferably in an amount of about 0.02 mol % of initial diester to about 0.16 mol % of initial diester, even more preferably from about 0.04 mol % of initial diester, to about 0.16 mol % of initial diester.

A preferred polycondensation catalyst is solubilised antimony oxide, e.g., antimony glycolate, which can be obtained after refluxing antimony oxide over night in ethylene glycol. Another option which is a combination of transesterification catalyst and polycondensation catalyst that is of particular interest, is based on a tin(IV) type catalyst during transesterification, which is reduced to a tin(II) type catalyst during the polycondensation. Reducing compounds to be used include phosphites, such as alkyl and arylphosphites, with triphenylphosphite and tris(nonylphenyl)phosphite as preferred examples.

Of particular interest is that the combination of tin(IV) type catalyst and tin(II) type catalyst retains activity, allowing the same catalyst to be used for a subsequent solid state polycondensation as the third step in the polymerization process.

Step 3 is a solid state polycondensation (SSP), which is a common process used in the preparation of PET. In SSP processes pellets, granules, chips or flakes of polymer are subjected for a certain amount of time to elevated temperatures (below melting point) in a hopper, a tumbling drier or a vertical tube reactor or the like.

The inventors found that when the preferred catalysts were used for steps 1 and 2 and when the preferred process conditions were used for steps 1 and step 2, the desired end-groups may be obtained after the polycondensation step, allowing to reach a number average molecular weight larger than 25,000 during the solid stating step. These molecular weights are advantageous as they allow the production of bottles via Injection Stretch Blow Moulding, melt spinning of fibres and extrusion of films with very good mechanical properties. These products obtained from high molecular weight FDCA-based polymers are considered to be new.

In JP2008/291244 Mitsubishi dissolved and precipitated the resin based on the 2,5-furandicarboxylate moiety, and then solid stated at a temperature of 140 to 180° C. The applicants have found that this is not a reasonable procedure for the production of polyesters useful in ordinary commodity applications. The applicants have found that solid stating of the resin is critical and that temperatures of 190° C. or higher, and preferable 200° C. or higher, are desirable. The upper limit is restricted by the resins tendency to stick to itself as the temperature approaches the melting point of the resin. Therefore, the temperature should be raised very slowly in order to get above the desired 200° C.

Applicants have found the solid stating process to be slow, even at these relatively elevated temperatures, and it is preferred to use small pellets. Suitable pellet size, for example, may be about 100 or more pellets per gram, or preferably 200 or more pellets per gram. Even smaller pellets can be used to advantage, and for example may be produced using a "micropelletizing" technology such as from Gala Industries. An alternative technology, using sintered particle technology, might also be advantageous. In this technology, very small particles are physically stuck together into larger, porous pellets in order to have a short path length for diffusion of vapours but still retain a larger macro pellet size for conveyance and melting in extrusion devices. An example of such a technology used for PET recycle is applied by Phoenix Technologies International LLC of Ohio, USA.

Polyesters and various copolymers (random or block) may be made according to the process of the current invention, depending on the selection of the monomers used. For instance, linear polyesters may be made with 2,5-FDCA (in the form of its methyl ester) and an aromatic, aliphatic or cycloaliphatic diol. The 2,5-FDCA ester may be used in combination with one or more other dicarboxylic acid esters or lactones. Likewise, the diol may be a combination of two or more diols. Polyesters that have never been produced before and that are claimed in this application are those having both a 2,5-furandicarboxylate moiety within the polymer backbone, as well as a 1,4-bis(hydroxymethyl) cyclohexane (either of the stereoisomers or a mixture thereof) or 1,1,3,3-tetramethylcyclobutanediol (either of the stereoisomers or a mixture thereof) or 2,2-dimethyl-1,3-propanediol or poly(ethylene glycol) or poly(tetrahydrofuran) or glycerol or pentaerythritol or lactic acid (derived from L or D lactide or a mixture thereof) or 6-hydroxyhexanoic acid (e.g., derived from caprolactone) within the polymer backbone.

The polymers and copolymers according to the current invention need not be linear. If a polyfunctional aromatic, aliphatic or cycloaliphatic alcohol is used, or part of the diol is replaced by such a polyol, then a branched or even cross-linked polymer may be obtained. A branched or cross-linked polymer may also be obtained when part of the 2,5-FDCA ester is replaced by an ester of a polyacid.

Examples of suitable diol and polyol monomers therefore include ethylene glycol, diethylene glycol, 1,2-propanediol, 1,3-propanediol, 1,4-butanediol, 1,5-pentanediol, 1,6-hexanediol, 1,4-cyclohexanedimethanol, 1,1,3,3-tetramethylcyclobutanediol, 1,4-benzenedimethanol, 2,2-dimethyl-1,3-propanediol, poly(ethylene glycol), poly(tetrahydrofuran), 2,5-di(hydroxymethyl)tetrahydrofuran, isosorbide, glycerol, pentaerythritol, sorbitol, mannitol, erythritol, threitol.

Preferred examples of diols and polyols are ethylene glycol, 1,3-propanediol, 1,4-butanediol, 1,4-cyclohexanedimethanol, 1,6-hexanediol, 2,2-dimethyl-1,3-propanediol, poly(ethylene glycol), poly(tetrahydrofuran), glycerol, pentaerythritol.

Suitable dicarboxylic acid esters or polycarboxylic acid esters to be used in combination with the 2,5-furandicarboxylate ester therefore include dimethyl terephthalate, dimethyl isophthalate, dimethyl adipate, dimethyl azelate, dimethyl sebacate, dimethyl dodecanedioate, dimethyl 1,4-cyclohexane dicarboxylate, dimethyl maleate, dimethyl succinate, trimethyl 1,3,5-benzenetricarboxylate.

Preferred examples of dicarboxylic acid esters or polycarboxylic acid esters to be used in combination with the 2,5-furandicarboxylate ester are dimethyl terephthalate, dimethyl adipate, dimethyl maleate, dimethyl succinate, trimethyl-1,3,5-benzenetricarboxylate. More preferably, these may be present in a molar ratio of about 10:1 to about 1:10 vis-à-vis the 2,5-furandicarboxylate ester. This mixture of reactants is referred to as the acid ester reactant.

Preferred examples of lactones to be used in combination with the 2,5-furandicarboxylate ester are pivalolactone, caprolactone and lactides (L,L; D,D; D,L).

The polymers of the current invention are of value in all forms of application where currently PET and similar polyesters are used. For instance, they may be used in fibres, films and packaging materials.

The polymers of the current invention may be used as such or in blends and compounds. They may contain other components such as plasticizers, softeners, dyes, pigments, antioxidants, stabilizers, fillers and the like.

As can be seen above, although resins based on the 2,5-furandicarboxylate moiety have been produced in the past 70 years and are described in the literature, very little is known about the physical properties or the performance of the material when it is subjected industrially relevant processing conditions to obtain bottles, fibres and films. The inventors have discovered and describe herein that the processing of these resins into useful products is possible, although the conditions of the processing and the properties of the resin and thus its synthesis needs to be optimized for the desired processing to be successful.

Examples are provided that give details on work which was conducted using a PEF resin, with direct comparison to a PET resin. As shown in the example, the PEF resin has a higher softening point, by approximately 10-12° C. This attribute can be used to benefit when it is desired, for example, to pasteurize in a bottle or container after it has been filled, or when it is desired to fill the package with a hot liquid.

Example 4 shows work comparing the stress-strain relationship for drawing a PEF resin compared to a PET resin, at temperatures above the glass transition temperature of the resin. The PEF resin is stiffer (higher modulus) than the PET resin and also undergoes a more pronounced yield and a delayed onset of strain hardening. This has significant implications for the production of useful materials and packaging from the PEF resin.

Example 5 describes the production of injection stretch blow moulded bottles from PEF. The material distribution in these first bottles was not as uniform as desired, and the inventors believe that this is at least in part due to the late onset of strain hardening. Even so, the materials were tested and found to have superior barrier properties for oxygen, $CO_2$, and water, when compared to PET bottles made using the same mould.

Prior to the present invention, the high barrier properties of PEF in an oriented structure, such as a bottle, were unknown. The use of PEF for a packaging material on the basis of these barrier properties is new. The barrier properties are such that a carbonated soft drink container could be made smaller than current containers and still have a useful shelf life, because the rate of passage of $CO_2$ gas through the container will be reduced. Current products are limited either by absolute loss of carbon dioxide pressure or by the changing pressure of carbon dioxide and the resultant change in properties.

The use of PEF for packaging of oxygen sensitive materials is also new. The barrier properties of the PEF bottle are such that the rate of penetration of oxygen into the container is reduced by five-fold compared to a conventional PET container. This level of oxygen barrier may be sufficient to use the resin for packaging of oxygen sensitive materials such as fruit juices, vitamin waters, beer, and wine without relying on costly oxygen scavengers or multilayer film technology. If oxygen scavengers are still used, in order to further increase the shelf life, for example, then the quantity of oxygen scavenger can be reduced relative to the amount which is needed in a conventional PET bottle.

When PEF or other resins based on the bio-derived 2,5-furandicarboxylate moiety are used for packaging, such as bottles, then it may also be desired to incorporate other improvements into the packaging, such as use of a bio-based closure. Exemplary materials for closures include the use of poly(hydroxyl butyrate-co-valerate) (PHBV), other poly(hydroxyalkanoates), poly(lactic acid), or new bio-based materials such as poly(butylene succinate). The label may be of a clear or coloured material, and may be attached with adhesives or used as a shrink sleeve. Either the adhesive or the shrink sleeve could be made, for example, from bio-based materials including but not limited to poly(lactic acid) based materials. It may also be desirable to include a dye in the resin formulation in order to give a distinctive look to the packaging or to protect the materials inside from light. For example, a dark amber or green bottle might be suitable for the packaging of beer. For "clear" bottles a suitable amount of a bluing agent can be used to help mask the small amount of yellow colour which is found in many polymeric resins, including those based on the 2,5-furandicarboxylate moiety. If it is desired to print directly unto the resin based on the 2,5-furandicarboxylate moiety then various surface treatments, such as corona treatment, may be useful for modifying the nature of the print adsorption. If used as a packaging material then the resin may also be subjected to sterilization using any of the techniques known in the art, including but not limited to ozone treatment, UV treatment, e-beam treatment, and the like.

On the basis of the stress-strain findings detailed in the example, the inventors believe that the optimum properties for a bottle, for example, will rely on having higher stretch ratios than a conventional PET bottle design. The inventors believe that the optimum axial stretch ratio may be in the range of 2.0 to 4.0, and more preferably in the range of 2.6 to 3.7. Optimum radial ratios may be in the range of 5 to 7.0, and more preferably in the range of 5.3 to 6.8. The overall areal ratio will preferably be in the range of 16 to 25, and more preferably in the range of 18 to 23.

Preferred bottle sizes for the stretch ratios described above will be in the range of 300 ml to 2 liter.

The inventors believe that the bottle sidewall thickness might suitably be in the range of 0.005 inch to 0.015 inch (0.13-0.38 mm), and more preferably in the range of 0.007 to 0.010 inch (0.18-0.25 mm). The combination of high tensile modulus and high barrier properties allow functional products to be made even when using a reduced amount of resin on a volume basis, compared to conventional PET resins. The high modulus may also translate into stiffer bottles with less pronounced creep, further improving the package stability. The tensile modulus of PET bars was found to be approximately 340,000 psi (23.4 kbar) at room temperature, whereas the tensile modulus of PEF bars was found to be 590,000 psi (40.7 kbar).

The optimal resin molecular weight for suitable bottle production via injection stretch blow moulding processes is not yet completely understood, but the inventors believe that the number average molecular weight of the resin should preferably be in the range of 25,000 to 50,000, and more preferably in the range of 31,000 to 47,000, and most preferably in the range of 35,000 to 44,000. The number average molecular weight is determined by gel permeation chromatography (GPC) using polystyrene standards. The applicants believe that use of a higher molecular weight resin will help to overcome the delayed onset of strain hardening.

As with other polyesters, it is desirable to crystallize the polymer pellet to prevent sticking and to enable high temperature drying to eliminate degradation due to hydrolysis in the processing equipment. Drying can be conducted at any convenient temperature below the melting point of the polymer. It is essential that the polymer used for critical applications such as bottle manufacture be thoroughly dried before processing in order to maintain a consistent molecular weight. Preferably the moisture content will be less than 200 ppm by weight, and more preferably less than 50 ppm by weight.

As an alternative to a high number average molecular weight, it is also be possible to modify the resin by incorporating a high molecular weight component. The high molecular weight component can be either based on the 2,5-furandicarboxylate moiety or based on an entirely different resin. If it is based on the 2,5-furandicarboxylate moiety then a high molecular weight material can be produced by the use of coupling agents or branching agents, as are known in the art and which are available for reactions of the hydroxyl terminal groups or of the acid terminal groups. For the methods of production described herein, the predominant terminal group is believed to be hydroxyl. Suitable coupling agents include, but are not limited to, materials such as triphenyl phosphite or other multi-site phosphites, pyromellitic anhydride or other multifunctional anhydrides, isocyanates, multifunctional epoxides, multifunctional carbodiimides, and so forth.

Applicants have found that it was possible to heat the preforms to the desired temperature for blowing without the use of any reheat additives. However, it may well be desirable to include reheat additives to optimize cycle times and power absorption into the preforms. Suitable materials are known in the art.

One very relevant finding is that the resins based on the 2,5-furandicarboxylate moiety are very slow to thermally crystallize. In practice this means that it is not necessary to reduce the rate of thermal crystallization in resins used for bottle production. Most poly(ethylene terephthalate) bottle grade resins include a small amount, on the order of 1-5 mol % of a diacid such as isophthalic acid in order to retard the crystallization. Applicants have discovered that no such crystallinity disrupter is need for resins based the 2,5-furandicarboxylate moiety. The preferred bottle resin is believed to be a resin based on the 2,5-furandicarboxylate moiety which contains less than 2 mol % of any other diacid, more preferably less than 1 mol % of any other diacid, and most preferably less than 0.3 mol % of any other diacid. This is in contrast to PET polymer resins used for bottles.

The process of polymer production invariably leads to a small amount of diethylene glycol being produced. Applicants have found, that similar to PET production, it is desirable to minimize the amount of this material which is formed. The preferred PEF resin has less than 2 mol % of diethylene glycol and more preferably less than 1 mol % diethylene glycol, and most preferably less than 0.7 mol % of diethylene glycol.

Resins suitable for the use in bottles will preferably not contain significant levels of acetaldehyde, which can impart off-flavors to the beverage. It is an important function of solid stating the resin to allow the any acetaldehyde which is present to diffuse out of the pellets. It is also important that in subsequent melt-processing steps those conditions be selected so as to minimize the formation of any new quantities of acetaldehyde. The applicants have found that it is possible to melt-process a PEF resin at temperatures below 250 C and produce a useful material. For example, in the production of preforms for injection stretch blow moulded bottles, it is typical to process PET at temperatures of 260° C. or higher, and often 265° C. or higher. For PEF we have found that it is possible, and preferable, to process at a temperature of less than 250° C. and more preferably less than 240° C. It is preferred that a temperature range of 230° C. to 240° C., as it will give the most desirable results for the barrel temperature during injection moulding of PEF preforms.

The PEF resin has a higher modulus and a higher glass transition temperature than PET resin, and so will require somewhat higher temperatures for bottle blowing. Applicants believe that the optimum temperature for injection stretch blow moulding of bottles will be in the range of 98° C. to 112° C., and more preferably in the range 102° C. to 108° C. Bottle machine parameters such as timing of the various events, injection rod speed, inflation pressure, inflation time, mould temperature, and so forth are all parameters which can be adjusted to influence the bottle blowing process. It is anticipated that use of a heat set step may also be useful to further enhance the temperature stability of the bottle.

Specifics in the preform design can also be used to modify the bottle characteristics and help to smooth out the material distribution.

The following examples illustrate the current invention.

EXAMPLES

Materials 2,5-Furandicarboxylic acid (FDCA) and dimethyl-2,5-furandicarboxylate (DMF) were prepared according to WO2011043660. Diols, solvents and catalysts were supplied by Aldrich and used as received.

Analytical Techniques

GPC measurements were performed on a Merck-Hitachi LaChrom HPLC system equipped with two PLgel 10 μm MIXED-C (300×7.5 mm) columns. Chloroform:2-chlorophenol 6:4 solvent mixture was used as eluent. Calculation of the molecular weight was based on polystyrene standards and carried out by Cirrus™ PL DataStream software.

UV-visible spectra and absorbances were recorded on a Heliosa (ThermoSpectronic) spectrophotometer.

Example 1

Polymerization with Ca—Sb Catalyst System

Polymerizations were carried out in a 15 liter stirred batch reactor. Dimethyl 2,5-furandicarboxylate (5.0 kg; 27.17 mol), bioethylene glycol (4.02 kg; 64.83 mol) and Ca acetate monohydrate (8.48 g (48.1 mmol) were mixed under nitrogen in the pre-dried reactor, while heating to a temperature of 130° C. when the methanol starts to distill off. The temperature is kept at about 130° C. till most of the methanol is distilled out. Subsequently, the temperature is raised to 190° C. (mantle temperature) under nitrogen flush for 2 hours. Then Sb glycolate (3.48 g $Sb_2O_3$ dissolved in 200 mL bioethylene glycol) was added under stirring at 40 rpm. The temperature was increased to 210° C. while vacuum was applied slowly. At 300 mbar most of the ethylene glycol was distilled off. Finally, the vacuum was reduced as much as possible, but definitely below 1 mbar. The mantle temperature was raised to 240° C. and the molecular weight increase was monitored by measuring the stirrer torque.

The polymer that was obtained from the reactor was shown to have a Mn of 16.000 g/mol and a Mw/Mn of 2.5. Solid state polymerization experiments were performed in a tumble dryer. During the first 12 hours, crystallization of the polymer was performed at 145° C. Subsequently, during a period of 72 hours, the temperature was slowly raised to above 200° C. Care was taken that polymer particles do not stick together. After 72 hours, the polymer had a $M_n$ of 30000 and $M_w/M_n$ of 2.1

Example 2

Polymerization with Zn—Sb Catalyst System

Transesterification

Into a 100 mL three-necked flask equipped with nitrogen inlet, mechanical stirrer and condenser set into horizontal position, 13.8 g DMF, 11.1 g ethylene glycol and 150 μL Zn(II) acetate stock solution (c=25.5 mg/mL) in ethylene glycol were added. Slow nitrogen flow was applied and then the flask was immersed into a 220° C. oil bath. Methanol started to distil at 137° C. After methanol distillation has subsided (~20 minutes), the condenser was set to a vertical position to reflux ethylene glycol. Nitrogen gas was continuously flowing through. Transesterification was finished after 4 hours, when 200 μL triethyl phosphonoacetate stock solution (c=46.7 mg/mL) was added (1.5:1.0 molar ratio of phosphonoacetate:Zn). After 5 minutes stirring, 236 μL antimony stock solution (c=13.9 mg/mL $Sb_2O_3$) was measured and added to the mixture which was stirred for another 5 minutes. The $^1H$ NMR spectrum of a sample taken after 4 hours showed less than 0.04 mol % (relative to furan ring) methyl ester end group.

Polycondensation

After completion of catalyst addition, vacuum was slowly applied and the temperature was raised to 240° C. (oil bath temperature). The stirrer speed was set to 100 rpm. After 3 hours polycondensation the vacuum was released and the PEF was taken out by a spoon. $M_n$=17900; $M_w$=42800; PDI=2.39; A (30 mg/mL)=0.007 (measured in dichloromethane:hexafluoroisopropanol 8:2 at 400 nm)

Solid State Polymerization (SSP)

SSP experiments were carried out in small glass tubes (17 cm high, 8 mm inner diameter) closed with glass frit (P1) on one end and placed in an aluminum block heater equipped with nitrogen inlet. The polymer was ground and sieved into 0.6-1.4 mm particles then crystallized at 110° C. overnight. After crystallization, 100 mg polymer was measured into each tube. SSP was conducted at 210° C. under a nitrogen flow of 4.0 mL/min. After two days SSP (Table 2), as high as 52000 $M_n$ was achieved.

TABLE 2

SSP results of PEF prepared with Zn—Sb catalyst system.

| SSP Time | Mn | Mw | PDI |
| --- | --- | --- | --- |
| 0 day | 17900 | 42800 | 2.39 |
| 1 day | 45500 | 112400 | 2.47 |
| 2 days | 52200 | 126900 | 2.43 |
| 5 days | 48200 | 124700 | 2.58 |

Example 3

A sample of PEF resin, with molecular weight approximately 30,000 Mn, was made into a straight sided bar sample using an injection moulding machine. A sample of PET resin, Eastar EN052 PET, was also moulded using the same equipment. The bars were subjected to a heat distortion measurement according to ASTM E2092. The heat distortion temperature of the PET sample was found to be 64.5° C. and the heat distortion temperature of the PEF sample was found to be 76.6° C., or 12° C. higher than the heat distortion temperature of the PET reference bar.

Example 4

Stress Strain Curves for PEF and PET Above Tg

Sample films were prepared from a PET resin and from a PEF resin, and subjected to tensile testing using a TA Instruments ARES instrument. The PEF films show a very pronounced yield, with strain hardening at high extensions. The onset of strain hardening at 90° C. was approximately 3× extension, and at 95° C. it was at 4×. The PET films show a less pronounced yield and earlier onset of strain hardening. For PET the onset at 90° C. was approximately 2.5× extension and at 95° C. it was just over 4×. For PET the yield stress was approximately $2-3*10^6$ Pa, whereas for PEF it was $6-18*10$ Pa at the same temperatures. Typically the PEF will need to be processed (for blow moulding step) at somewhat higher temperature than PET, in order to reduce the modulus so that inflation can occur. In that case, for example at 100° C., the onset of strain hardening was at about 5× for PEF with a yield stress of $3*10^6$ Pa. This compares to PET at 90° C., where the yield stress was similar, but the onset of strain hardening was at 2.5×.

Example 5

Bottle Blowing Using PEF Resin

PEF resin with a number average molecular weight of approximately 29,900 was crystallized and dried. Several kilograms were used in an Arburg 320 M injection moulding machine to injection mould a preform of 26.4 gram weight. The same preform, when used with PET resin, yields a preform of 24.5 gram weight. The PEF preforms were produced using an injection moulding barrel temperature of 235 C, whereas the PET was produced using a temperature of 268° C. The overall cycle time for the PEF injection moulding was faster than the PET injection moulding, at 21 seconds and 25 seconds, respectively.

The preforms were subsequently blown into bottles using a Sidel SBO1/2 blow moulding machine using a 24 ounce straight wall model, suitable for carbonated soft drink bottles. A large variety of conditions were tested, and eventually a preform temperature of 102° C. was found to be best for the PEF resin. Material distribution was still less even than desired, but bottles could be made and tested. The PET was blown into bottles with a preform temperature of 98° C.

Testing of the side panels revealed that the PEF had an oxygen barrier more than five-fold better than the PET bottle panel, and $CO_2$ was approximately two-times better. Testing on the whole package revealed the water barrier to be about two times better also.

Molecular weight of the resin in the final bottle was determined to be approximately 27,000 Mn.

REFERENCES

[1] Hachihama, Y.; Shono, T.; Hyono, K. Synthesis of Polyesters containing Furan Ring, Technol. Repts. Osaka Univ. 1958, 8, 475-480.

[2] Moore, J. A.; Kelly, J. E. Polyesters Derived from Furan and Tetrahydrofuran Nuclei. Macromolecules, 1978, 11, 568-573.

The invention claimed is:

1. A polyester-containing object made from melt-processing poly(ethylene-2,5-furandicarboxylate), wherein the poly(ethylene-2,5-furandicarboxylate) has been prepared from 2,5-furan dicarboxylic acid moieties and ethylene glycol;

wherein the poly(ethylene-2,5-furandicarboxylate) has a number average molecular weight of at least 25,000, as determined by GPC based on polystyrene standards, wherein the poly(ethylene-2,5-furandicarboxylate) has an absorbance as a 5 mg/mL solution in a dichloromethane:hexafluoroisopropanol 8:2 at 400 nm of below 0.05, and wherein the poly(ethylene-2,5- furandicarboxylate) comprises an antimony catalyst.

2. The object according to claim 1, wherein the poly (ethylene-2,5-furandicarboxylate) further comprises is a calcium or zinc catalyst.

3. The object according to claim 1, wherein the poly (ethylene-2,5-furandicarboxylate) has an absorbance as a 5 mg/mL solution in a dichloromethane:hexafluoroisopropanol 8:2 at 400 nm of below 0.05, without intermediate or subsequent purification and/or washing step.

4. The object according to claim 1, which is an injection stretch blow moulded bottle.

5. The object according to claim 1, which is biaxially oriented film.

6. The object according to claim 1, which is a drawn fibre.

* * * * *